US012807875B2

(12) United States Patent
Castelo Alves Ferreira et al.

(10) Patent No.: US 12,807,875 B2
(45) Date of Patent: Nov. 24, 2026

(54) OIL DISPERSANT FORMULATION, METHODS AND USES THEREOF

(71) Applicants: INSTITUTO SUPERIOR TÉCNICO, Lisbon (PT); SINTEF OCEAN, Trondheim (NO)

(72) Inventors: Frederico Castelo Alves Ferreira, Lisbon (PT); Umer Farooq, Trondheim (NO); Ariadna Sabina Szczybelski Ciordia, Trondheim (NO); Roman Netzer, Trondheim (NO); Nuno Ricardo Torres Faria, Lisbon (PT); Margarida Maria Machado Borges, Lisbon (PT); Petar Kekovic, Lisbon (PT)

(73) Assignees: INSTITUTO SUPERIOR TECNICO, Lisbon (PT); SINTEF OCEAN, Trondheim (NO)

( * ) Notice: Subject to any disclaimer, the term of this patent is extended or adjusted under 35 U.S.C. 154(b) by 358 days.

(21) Appl. No.: 18/711,703

(22) PCT Filed: Nov. 3, 2022

(86) PCT No.: PCT/PT2022/050030

§ 371 (c)(1), (2) Date: May 20, 2024

(87) PCT Pub. No.: WO2023/091038

PCT Pub. Date: May 25, 2023

(65) Prior Publication Data

US 2025/0011651 A1 Jan. 9, 2025

(30) Foreign Application Priority Data

Nov. 18, 2021 (PT) ........................................ 117583

(51) Int. Cl.

| | |
|---|---|
| ***C09K 23/32*** | (2022.01) |
| ***C02F 1/68*** | (2023.01) |
| ***C02F 101/32*** | (2006.01) |
| ***C02F 103/08*** | (2006.01) |
| ***C09K 23/42*** | (2022.01) |

(52) U.S. Cl.

CPC .............. *C09K 23/32* (2022.01); *C02F 1/682* (2013.01); *C09K 23/42* (2022.01); *C02F 2101/32* (2013.01); *C02F 2103/08* (2013.01); *C02F 2305/04* (2013.01)

(58) Field of Classification Search

CPC . C10G 33/04; Y02A 20/204; C02F 2103/365; C02F 2305/04; C09K 23/32

See application file for complete search history.

(56) References Cited

U.S. PATENT DOCUMENTS 10,889,766 B2 * 1/2021 Barreau ................ C10G 33/04

FOREIGN PATENT DOCUMENTS

WO 2018197623 A1 11/2018

OTHER PUBLICATIONS

Almeda, R. et al., Toxicity of dispersant Corexit 9500A and crude oil to marine microzooplankton. Ecotoxicology and Environmental Safety, May 2014, pp. 76-85.

Aparna, A. et al. "Production and characterization of biosurfactant produced by a novel *Pseudomonas* sp. 2B", Colloids and Surfaces B: Biointerfaces, Mar. 2012, pp. 23-29.

Athas, J.C., et al., "An Effective Dispersant for Oil Spills Based on Food-Grade Amphiphiles", Langmuir, Jul. 2014, pp. 9285-9294.

Baharuddin, S.H., et al., "Development, formulation and optimization of a novel biocompatible ionic liquids dispersant for the effective oil spill remediation", Chemosphere, Feb. 2020 (9 pages).

Banat, I. M. et al., "Potential commercial applications of microbial surfactants", Applied Microbiology and Biotechnology, Springer Berlin Heidelberg, Berlin/Heidelberg, May 2000, pp. 495-508.

Banat, I.M., et al., "Microbial biosurfactants production, applications and future potential", Applied Microbiology and Biotechnology, Apr. 2010, pp. 427-444.

Belhaj, A.F., et al., The effect of surfactant concentration, salinity, temperature, and pH on surfactant adsorption for chemical enhanced oil recovery: a review:, Journal of Petroleum Exploration and Production Technology, Jan. 2020, pp. 125-137.

Chandrasekar, S. et al., Dispersant effectiveness on oil spills—impact of salinity, ICES Journal of Marine Science, Apr. 2006, pp. 1418-1430.

Figueiredo Nascimento, M., "Mannosylerythritol lipids bioproduction by *Moesziomyces* spp.: assessing alternative culture strategies and nanofiltration downstream purification", in Department of Bioengineering. Nov. 2017, pp. 20-22.

Freitas, B., et al., "Formulation of a Commercial Biosurfactant for Application as a Dispersant of Petroleum and By-products Spilled in Oceans", Frontiers in Microbiology, Oct. 2016 (9 pages).

Garr, A.L. et al., "Toxic Effects of Oil and Dispersant on Marine Microalgae", Bulletin of Environmental Contamination and Toxicology, Oct. 2014, pp. 654-659.

(Continued)

*Primary Examiner* — Ryan B Huang

(74) *Attorney, Agent, or Firm* — Leason Ellis LLP

(57) ABSTRACT

The present disclosure relates to an oil dispersant composition for dispersing a crude oil or a petrochemical spill comprising at least 20% (w/w) of a gum comprising a mannosylerythritol lipids mixture; at least 10% (w/w) polyethylene glycol sorbitan ester; and at least 20% (w/w) of a hydrophobic organic solvent, wherein said organic solvent has a flash point superior to the crude oil or the petrochemical spill flash point, preferably superior to 60° C. The disclosure also relates to a method for obtaining said composition as well as a method for dispersing an oil spill, comprising the step of applying the disclosed oil dispersant composition with an oil present in a body of water.

20 Claims, 3 Drawing Sheets

(56) References Cited

OTHER PUBLICATIONS

Gbadamosi, A.O., et al., "An overview of chemical enhanced oil recovery: recent advances and prospects", International Nano Letters, Apr. 2019, pp. 171-202.
International Search Report for corresponding PCT Application No. PCT/PT2022/050030 dated Feb. 3, 2023 (3 pages).
Jin, J., et al., "An efficient and environmental-friendly dispersant based on the synergy of amphiphilic surfactants for oil spill remediation" Chemosphere, Jan. 2019, pp. 241-247.
Kleindienst, S., et al., "Chemical dispersants can suppress the activity of natural oil-degrading microorganisms", Proceedings of the National Academy of Sciences, Apr. 2015 (6 pages).
Mackay, D. et al., "The laboratory determination of dispersant effectiveness: method development and results", International Oil Spill Conference Proceedings, Nov. 1981, pp. 11-17.
Sandersen, S.B., "Enhanced Oil Recovery with Surfactant Flooding, in Department of Chemical and Biochemical Engineering", Technical University of Denmark: Konges Lingby, Denmark, May 2012 (163 pages).
Shah, M.U.H., et al., "A binary mixture of a biosurfactant and an ionic liquid surfactant as a green dispersant for oil spill remediation", Journal of Molecular Liquids, Feb. 2019, pp. 111-119.
Soberón-Chávez et al., "Biosurfactants: A General Overview", Biosurfactants: From Genes to Applications, Jan. 2011, pp. 1-11.
Sorial, G.A., et al., "Oil Spill Dispersant Effectiveness Protocol. II: Performance of Revised Protocol", Journal of Environmental Engineering, Oct. 2004, pp. 1085-1093.
Venkataraman, Swethaa, et al., "Extraction, purification and applications of biosurfactants based on microbial-derived glycolipids and lipopeptides: a review", Nov. 2021, pp. 949-970.
Yu, M., et al., "Characteristics of mannosylerythritol lipids and their environmental potential", Carbohydrate Research, Jan. 2015, pp. 63-72.
Zhang, K., et al., "Generation of shrimp waste-based dispersant for oil spill response", Environmental Science and Pollution Research, Jan. 2018, pp. 9443-9453.

* cited by examiner

OIL DISPERSANT FORMULATION, METHODS AND USES THEREOF

CROSS-REFERENCE TO RELATED APPLICATIONS

This application is a U.S. National Stage Application under 35 U.S.C. § 371 of International Patent Application No. PCT/PT2022/050030, filed Nov. 3, 2022, which claims priority to Portugal Patent Application No. 117583, filed Nov. 18, 2021, the contents of which are each hereby incorporated by reference in their respective entireties.

TECHNICAL FIELD

The present disclosure relates to an environmentally friendly and efficient bio-based oil dispersant for application in oil industry under different environmental conditions.

BACKGROUND

Planning responsible oil production and transportation strategies is one of the most critical challenges which the oil and gas industry is facing today. Several areas of this industry currently require the use of synthetic chemicals on a large scale. During the implementation of enhanced oil recovery (EOR) processes, there are several environmental risks associated with the utilization of FOR chemicals [1], especially due to the discharge of water after its use, potentially resulting in pollution of soils, surface waters and groundwater, with particularly harmful consequences in the Arctic and more vulnerable ecosystems.

The use of chemical dispersants as an oil spill response (OSR) measure has been generally accepted [2, 3]. However, there is evidence that these products can be highly toxic to marine planktonic [4-6]. Particularly, it has been reported that the use of the anionic surfactant Dioctyl sodium sulfosuccinate (DOSS), which is an important component of the most widely used commercial oil dispersant Corexit 9500A reduces the rate of oxidation of crude oil by microbial catalysis and has toxic effects on microalgae and other marine organisms. Moreover, the currently used surfactants/dispersants are not effective over wide temperature and salinity ranges. Therefore, there is an urgent need to replace synthetic oil dispersants, which are crude oil derivatives and hazardous chemicals, by environmentally friendly bio-based compounds with high ecological performance and high dispersion effectiveness (DE) over wide salinity and temperature ranges.

Dispersants currently used in oil spills are usually a blend of non-ionic and anionic surfactants dissolved in a solvent base. Surfactants are amphiphilic molecules containing both hydrophobic and hydrophilic regions, so they are soluble in both oil and water phases. An empirical parameter used for the classification of surfactants is the hydrophilic-lipophilic balance (HLB) number. The HLB is defined as:

$$HLB = 20 \times \frac{Mh}{M} \qquad \text{(Equation 1)}$$

Where $M_h$ is the molecular weight of the hydrophilic head group of the surfactant molecule, and M is the molecular mass of the complete molecule. HLB is given on a scale of 1-20. An HLB value between 1-8 shows a lipophilic surfactant (oil soluble), whereas an HLB value between 12-20 shows a hydrophilic surfactant (water soluble), promoting the formation of water-in-oil (W/O) and oil-in-water (O/W) emulsions, respectively. A surfactant with an HLB between 8 and 12 may promote either type of emulsion, but generally promotes O/W emulsions.

The working principle of the dispersant is to reduce the size of the oil droplets by lowering the interfacial tension (IFT) between the oil and water under the wave action. This is a process of emulsification, where an effective dispersant must convert the oil slick into discrete droplets that remain stable to coalescence. The oil droplets, which are stabilized by adsorbed surfactant molecules, are then carried below the water surface, where the oil in them is subsequently degraded by various microorganisms present in the water. The fraction of the spilled oil that is dispersed as droplets into the water column is termed the dispersion effectiveness (DE). Besides temperature and salinity, major factors affecting DE are oil viscosity, oil emulsification, mixing energy, dispersant formulation and dispersant-to-oil ratio (DOR).

In general, biosurfactants have numerous advantages in comparison with synthetic surfactants, especially regarding high biodegradability rate, low toxicity, high selectivity and maintaining their activity even in extreme temperature, pH and salinity conditions [7]. When biosurfactants are applied, their monomers organize spherically (micelles), in a way that the hydrophobic region is turned to the center, composing the nucleus, and the hydrophilic region is turned to the sphere surface, making an interface with water. The biosurfactants efficiency is determined by their critical micelle concentration (CMC), the values at which micelles start to form [8]. Micelles are produced as a result of several weak interaction forces, such as Van der Waals forces and hydrogen bonds. Micelle formation leads to the reduction in surface and interfacial tension, due to the decrease in the force of repulsion between immiscible liquids [9].

The three most promising microbial biosurfactants for bioremediation purposes are sophorolipids produced by *Starmerella bombicola* (also known as *Candida bombicola*), among other yeasts; mannosylerythritol lipids (MELs) produced by *Moesziomyces* spp. (previously named *Pseudozyma* spp.) yeasts; and rhamnolipids produced by some *Pseudomonas* spp., such as *P. aeruginosa*. MELs show strong activity against gram positive bacteria, weak activity against gram negative bacteria and no activity against fungi, which creates uncertainties regarding their influence on the whole biodegradation process.[10]

Freitas et al. [11] report the formulation process of a biosurfactant, sophorolipids, for application as an oil dispersant, but do not support the commercial potential for use this biosurfactant with the study of relevant dynamic interfacial mechanisms. This is due to a general misperception that surface tension and interfacial tension (IFT) are interchangeable concepts. However, for oil dispersion application the IFT of any oil dispersant formulation must be evaluated against seawater under variable conditions. This is particularly relevant at an early stage of the development of oil dispersant formulations in order to understand and prevent surfactant leaching. In addition, the manner of mixing the crude oil with a pure dispersant prior to adding to seawater greatly affects DE. Thus, different standardized dispersibility tests should be performed to evaluate the effect of mixing energy.

These facts are disclosed in order to illustrate the technical problem addressed by the present disclosure.

GENERAL DESCRIPTION

The present disclosure relates to a class of biosurfactants, MELs, which are stable at a wide range of temperatures and as non-ionic surfactants, their surface-active properties are stable over a wide pH and ionic strength range. Due to these properties, MELs are suitable for long-term storage. Together with their high biodegradability and low toxicity, MELs represent one of the most promising biosurfactants types with high potential for a broad range of industrial applications. They can also be produced sustainably from low-cost substrates by non-pathogenic microorganisms (*Moesziomyces* spp., formerly known as *Pseudozyma* spp.).

The present disclosure relates to an oil dispersant composition comprising non-toxic components for the marine environment, wherein the obtained dispersed oil particles are biodegradable. The present disclosure surprisingly discloses an environmentally friendly oil dispersant formulation based on bio-based compounds with high ecological performance and high dispersion effectiveness over a wide salinity and temperature ranges, preferably even at low temperatures. It was also demonstrated that the obtained dispersed oil particles are degraded by action of the microbial consortium present on the sea water and are not toxic for aquatic animals, preferably shellfish such as species of small shrimps.

In an embodiment, the MEL-based oil dispersant formulation comprises a blend of MELs (hydrophilic-lipophilic balance, HLB, 8.6) (42% w/w), polyethylene glycol sorbitan monooleate (HLB 15) (28% w/w), and a solvent base (30% w/w). In a further embodiment, the solvent base contains 66.7% (v/v) of a lighter fuel and 33.3% (v/v) of 2-ethylhexyl acetate.

For the scope and interpretation of the present disclosure, the term "lighter fuel" is defined as a gas, oil, or other fuel used in a lighter. In an embodiment, the lighter fuel is a combination of hydrocarbons, C10-C13, n-alkanes, iso-alkanes, cyclic, <2% aromatics. In an embodiment, the lighter fuel is white spirit type 3 (EC n° 918-481-9, or CAS No 64742-48-9).

In an embodiment, the DE of the MEL-based oil dispersant formulation was evaluated by IFT measurement and its performance on laboratory dispersibility tests using different types of crude oil, and bench-marked against Corexit 9500A (NALCO Environmental Solutions LLC). Crude oils used in the DE evaluation were (i) a naphthenic crude oil (fresh and weathered 200° C.+ Troll B), (ii) an asphaltenic crude oil (Oseberg A), (iii) a waxy crude oil (Norne 2), (iv) an intermediate fuel oil (IFO) 180 bunker fuel with high asphaltenic contents, and (v) a marine diesel oil (MDO) which is a blend of gasoil and heavy fuel oil.

For the scope and interpretation of the present disclosure the term "weathered 200° C.+" indicates that the oil was treated to simulate the evaporation loss of lighter crude oil components, when submitted, for 0.5 to 1 day, to the sea surface weathering. The evaporation was carried out as a simple one-step distillation at vapor temperature of 200° C.

In an embodiment, the spinning drop tensiometer was used to measure the IFT between seawater and crude oil in the presence of the MEL-based oil dispersant formulation or Corexit 9500A, in order to evaluate the effect of oil dispersant application parameters such as temperature, dispersant-to-oil ratio (DOR), and type of crude oil. The Mackay-Nadeau-Steelman (MNS) test and the Baffled Flask Test (BFT) were used as dispersibility tests with weathered 200° C.+ Troll B oil and IFO 180 bunker fuel oil at 13° C. (MNS), and fresh Troll B oil at 22° C. (BFT). The MNS test is estimated to represent sea-state conditions ranging from moderate to high, while the BFT represents breaking wave conditions. For MNS, both the dynamic and static DE of the oil dispersants were evaluated.

In an embodiment, the use of MEL-based oil dispersant formulation significantly reduces the IFT of crude oils (0.07-0.002 mN/m) and exhibits considerably better IFT results, than with Corexit 9500A, for assays with weathered 200° C.+ Troll B oil and IFO 180 bunker fuel oil. There was no apparent effect of temperature (5 to 60° C.) on the IFT when using naphtenic crude oil (fresh and weathered 200° C.+ Troll B) premixed with MEL-based oil dispersant formulation. In addition, the MEL-based oil dispersant formulation shows a high stability at extremely low concentrations. At low DOR (1:1000 to 1:500), the IFT of fresh Troll B oil was lower when mixed with MEL-based oil dispersant formulation than when mixed with Corexit 9500A, while at moderate (1:100 to 1:250 DOR) or high higher DOR (1:50 to 1:25), the use of Corexit 9500A displays slightly better IFT results.

In an embodiment, the BFT results show that the MEL-based oil dispersant formulation and of Corexit 9500A have similar DE for fresh Troll B oil (93-95%). As for MNS, the MEL-based oil dispersant formulation displays slightly lower DE than Corexit 9500A for dispersion of weathered 200° C.+ Troll B oil and of IFO 180 bunker fuel oil. Preliminary biodegradation studies have also suggested a higher capacity of MELs to promote the biodegradation of crude oil as compared to synthetic surfactants and other biosurfactants (e.g., rhamnolipids). According to Yu et al. [10], MELs have also the potential to outcompete rhamnolipids for bioremediation purposes since MELs show lower critical micelle concentrations and higher production yields.

The present disclosure relates to an oil dispersant composition for dispersing a crude oil or a petrochemical spill comprising: at least 20% (w/w) of a gum comprising a MELs mixture; at least 10% (w/w) polyethylene glycol sorbitan ester, preferably polyethylene glycol sorbitan monooleate; and at least 20% (w/w) of a hydrophobic organic solvent, wherein said organic solvent has a flash point superior to the crude oil or petrochemical spill flash point, preferably superior to 60° C.

In an embodiment, the disclosed composition comprises 35-45% (w/w) of the gum comprising a MELs mixture, preferably 42% (w/w); 25-30% (w/w) of polyethylene glycol sorbitan ester, preferably 28% (w/w); and 25-35% (w/w) of the hydrophobic organic solvent, preferably 30% (w/w).

In an embodiment, the gum mixture consists of a MELs mixture.

In an embodiment, the polyethylene glycol sorbitan ester may be polyethylene glycol sorbitan monooleate.

In an embodiment, the number of carbons (C) in the fatty chains of the MELs range from C8 to C12, preferably C10.

In a further embodiment, at least 50% (w/w) of the fatty chains of mannosylerythritol lipids are C10 chain, preferably 82% (w/w) of the fatty chains of MELs are C10 chain.

In an embodiment, the MELs are selected from a list comprising di-acetylated mannosylerythritol lipid, mono-acetylated mannosylerythritol lipid, de-acetylated mannosylerythritol lipid, or mixtures thereof.

In an embodiment, the gum comprises a mixture at least 50% (w/w) of di-acetylated mannosylerythritol lipid, preferably 55-70% (w/w); 15% (w/w) to 50% (w/w) of mono-acetylated mannosylerythritol lipid, preferably 20-35% (w/w); and less than 35% (w/w) of de-acetylated mannosylerythritol lipid, preferably 2-10% (w/w). In a further embodiment, the gum comprises a mixture of 68% (w/w) of di-acetylated mannosylerythritol lipid, 28% (w/w) of mono-acetylated mannosylerythritol lipid, and 4% (w/w) of de-acetylated mannosylerythritol lipid.

In an embodiment the solvent comprises 65-70% (v/v) of a lighter fuel.

In a further embodiment, the solvent further comprises 30-35% (v/v) of 2-ethylhexyl acetate.

In an embodiment, the mass ratio between the MELs and the polyethylene glycol sorbitan ester is 60:40.

In an embodiment the hydrophilic-lipophilic balance of the disclosed composition ranges from 8 to 20, preferably from 8 to 12.

An aspect of the present disclosure relates to the use of the disclosed oil dispersant composition in oil-spill clean-up operations, oil recovery processes, or flow assurance operations in oil industry as a dispersant, preferably as a biodegradable dispersant.

The present disclosure also relates to a method for obtaining the disclosed oil dispersant composition comprising the following steps: obtaining a gum comprising a MELs mixture; blending the MELs mixture with polyethylene glycol sorbitan ester and with a solvent base. In an embodiment, the solvent base comprises 65-70% (v/v) of lighter fuel and 30-35% (v/v) of 2-ethylhexyl acetate, preferably 66.7% (v/v) of lighter fuel and 33.3% (v/v) of 2-ethylhexyl acetate.

An aspect of the present disclosure relates to a method for dispersing an oil spill, comprising a step of applying the disclosed oil dispersant composition into an oil in a body of water.

In an embodiment, the oil dispersant composition is applied to the oil in a dispersant to oil ratio ranging from 1:1000 to 1:20.

In an embodiment, the oil dispersant composition is applied to the oil in a dispersant to oil ratio ranging from 1:900 to 1:500.

In an embodiment, the dynamic dispersion effectiveness of the oil dispersant composition in the body of water ranges from 95 to 100% at 22° C., measured by a Baffled Flask test.

In an embodiment, the static dispersant effectiveness of the oil dispersant composition in the body of water ranges from 45 to 70% at 13° C., measured by a Mackay-Nadeau-Steelman dispersibility test.

In an embodiment, the IFT between the oil and the body of water, in the presence of the disclosed oil dispersant composition, is below 0.030 mN/m at 20° C., measured by spinning drop method.

In an embodiment, the dynamic IFT between the oil and the body of water, in the presence of the oil dispersant composition, ranges between 0.04 to 0.002 mN/m at a dispersant to oil ratio of 1:20, from 5° C. to 60° C., measured by spinning drop method.

In an embodiment the body of water has a salinity ranging from 0 to 5 wt %.

In an embodiment, the environmental toxicity was assessed through the measurement of the median lethal concentration ($LC_{50}$) in *Artemia fransciscana*. These measurements confirmed the environmentally-friendly nature of the disclosed oil dispersant formulation, with $LC_{50}$ values higher than 250 mg/L, preferably higher than 350 mg/L.

BRIEF DESCRIPTION OF THE DRAWINGS

The following figures provide preferred embodiments for illustrating the disclosure and should not be seen as limiting the scope of invention.

DETAILED DESCRIPTION

Figure 1:
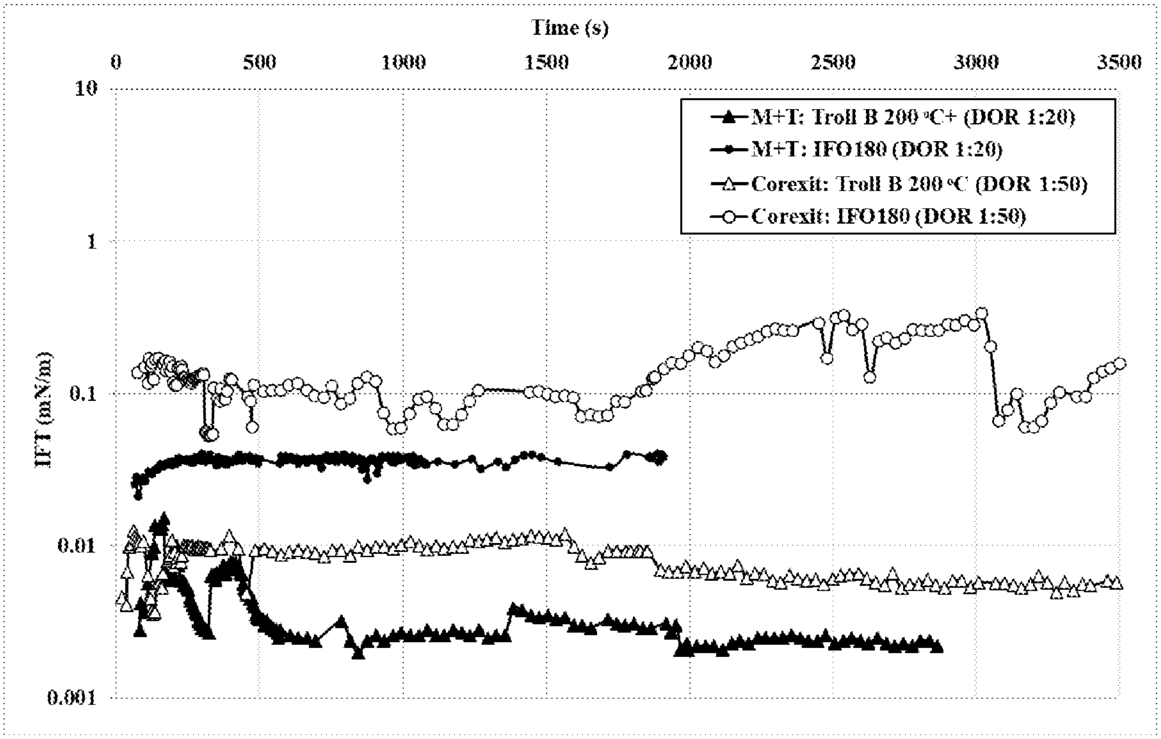
FIG. 1: Embodiment of the dynamic interfacial tension (IFT) of weathered 200° C.+ Troll B oil and IFO 180 bunker fuel oil in seawater (20-22° C.). Oils were premixed with Corexit 9500A (DOR 1:50) or with the MEL-based oil dispersant formulation ("M+T") (DOR 1:20). DOR: dispersant-to-oil ratio.

The present disclosure relates to an oil dispersant composition for use in the treatment of marine or soil oil spills, wherein the resulting oil dispersed particles are biodegradable. This efficient and environmentally friendly oil dispersant can be used for many industrial applications, particularly for oil spill clean-up operations. In oil industry, oil dispersants and surfactants can be used for oil spill response applications, enhanced oil recovery processes and flow assurance operations.

The rising environmental concerns and emergence of stricter regulations on oil recovery, transportation, and clean-up operations has forced the oil and gas sector to seek alternatives to the use of synthetic oil dispersants. The disclosed oil dispersant composition, based on the mannosylerythritol lipid (MEL), exhibits excellent interfacial properties and dispersion effectiveness (DE) with crude oils under different environmental conditions. In particular, when applied to weathered and heavy fuel oils the use of the MEL-based oil dispersant formulation exhibits considerably better DE results than when applied the more often commercially used oil dispersant, Corexit 9500A. Unlike synthetic oil dispersants, the MELs based dispersant is stable at a wide range of temperatures, pH and ionic strength, and have high biodegradability and low toxicity.

Example

In an embodiment, MELs used in the formulation of the disclosed MEL-based oil dispersant are produced from *M. antarcticus* using conditions previously described [12]. Cultivation starts with initial 40 g/l of D-glucose and after 4 days of cultivation, 20 g/l waste frying oil (WFO) is added. After 10 days, cultivation of *M. antarcticus* is extracted with ethyl acetate twice and the organic phase is collected and evaporated. The obtained orange gum has a purity in MELs of 88-90%. The ratio of the different MELs in this mixture is 68% (w/w) of di-acetylated (MEL-A), 28% (w/w) of mono-acetylated (MEL-B and -C) and 4% (w/w) of de-acetylated (MEL-D). The MELs' fatty acid chains range from C8 to C12 with 82% (w/w) of C10. The HLB for the MEL mixture is 8.6. MELs are then blended with polyethylene glycol sorbitan monooleate and the solvent base, at room temperature, for 2 h (500 rpm). Afterwards, the composition was stored at room temperature.

In an embodiment, the MEL-based oil dispersant formulation, comprises a blend of 42% w/w of a gum comprising a mixture of MELs (hydrophilic-lipophilic balance, HLB, 8.6), 28% w/w of polyethylene glycol sorbitan monooleate (HLB 15), and 30% w/w of a solvent base. The solvent base contains 66.7% (v/v) lighter fuel and 33.3% (v/v) of 2-ethylhexyl acetate.

Interfacial Tension Measurements of the MEL-Based Oil Dispersant Formulation.

In an embodiment, the IFT measurements are performed between crude oil and seawater in a Spinning Drop Tensiometer (SVT-20 N with SVTS 20 control and calculation software DataPhysics Instruments GmbH, Filderstadt, Germany) with a heating/refrigerated circulator for temperature control (F12-ED, Julabo GmbH, Seelbach, Germany). Prior to each measurement, the capillary tube is rinsed three times with dichloromethane, once with toluene, dried with nitrogen gas, rinsed three times with deionized water, dried with nitrogen gas, and then rinsed once with seawater. The capillary is carefully filled with seawater to ensure the absence of air bubbles. After the filling of capillary with seawater, closed the open side of the capillary with a septum held in the septum holder and inserted the fast exchange capillary into the measuring cell. Crude oil (10-30 μL), premixed with dispersant, or crude oil without dispersant (control), is injected into the stationary capillary tube using a 1 mL syringe with a long needle. Rotation is then immediately started and IFT measurements are initiated immediately after placing the droplet in the capillary.

The spinning drop tensiometer works by measuring the radius of oil phase under the high rotational speed using an optical microscope connected to a computer for data acquisition and calculations. The IFT is calculated using the following expression:

$$\gamma = \frac{\Delta\rho\omega^2 R^3}{4} \quad \text{(Equation 2)}$$

Where $\gamma$ (mN/m) is the interfacial tension (IFT) between oil and water phase; $\Delta\rho$ (g/cm3) is the density difference between the crude oil droplet and seawater; $\omega$ (rad/s) is the angular velocity, and R (cm) is the droplet radius.

During the first 5 min, IFT is measured after every 5 s and after this IFT is recorded after interval of 30 s. The IFT measurements are done on multiple droplets and standard deviations are typical ±0.2 mN/m for high IFT values (1-20 mN/m) and ±0.01 mN/m for low IFT values (0.001-0.9 mN/m).

In an embodiment, crude oils were pre-heated at 50° C. for 1 h and afterwards mixed with different formulations of oil dispersants at a specific DOR at room temperature for 3 h (500 rpm).

For the scope and interpretation of the present disclosure it is defined that "room temperature" should be regarded as a temperature between 15-30° C., preferably between 18-25° C., more preferably between 20-22° C.

In an embodiment, the MEL-based oil dispersant formulation was premixed with crude oils at a 1:20 DOR. Corexit 9500A was used at a 1:50 DOR as a reference since such dosage yielded the lowest IFT in previous laboratory studies. The overall results obtained, using the MEL-based oil dispersant formulation, indicate that with different types of crude oil, the initial (t=0 to t=100 s) and final IFT (after 60 min) vary between 0.006 to 0.070 mN/m, and between 0.002 to 0.070 mN/m, respectively (Table 1). No leaching from the oil/water interface is observed when used the MEL-based oil dispersant formulation with any type of crude oil. Furthermore, for all different types of crude oil assessed, the kinetics of the MEL-based oil dispersant formulation are very fast as the IFT is immediately reduced ~1000 times. On the contrary, with Corexit 9500A, the initial and final IFT of different types of crude oil vary between 0.006 to 0.14 mN/m, and between 0.006 to 0.19 mN/m, respectively. Moreover, some leaching/desorption of Corexit 9500A is observed from the interface between IFO 180 bunker fuel oil and seawater (FIG. 1).

TABLE 1

Interfacial tension (IFT) of different types of crude, weathered and fuel oils in seawater measured at 20° C. Oils were premixed with Corexit 9500A or with the MEL-based oil dispersant formulation ("M + T") at DOR of 1:50 and 1:20 respectively.

| Oil types | IFT (mN/m) 0-100 s "M + T" (DOR 1:20) | IFT (mN/m) 60 min "M + T" (DOR 1:20) | IFT (mN/m) 0-100 s Corexit 9500A (DOR 1:50) | IFT (mN/m) 60 min Corexit 9500A (DOR 1:50) |
|---|---|---|---|---|
| Fresh Troll B | 0.030 | 0.020 | 0.050 | 0.050 |
| Weathered 200° C. + Troll B | 0.004 | 0.002 | 0.010 | 0.006 |
| Norne 2 | 0.030 | 0.008 | 0.020 | 0.010 |
| Oseberg A | 0.040 | 0.020 | 0.007 | 0.006 |
| Diesel Fuel | 0.070 | 0.070 | 0.050 | 0.040 |
| IFO 180 Bunker Fuel | 0.030 | 0.030 | 0.100 | 0.200 |

DOR: dispersant-to-oil ratio.

In an embodiment, for the naphthenic crude oil (fresh Troll B oil) with the MEL-based oil dispersant formulation, the IFT is reduced from an average value of 9 mN/m to 0.030 mN/m between t=0 to t=100 s, and after 1 h the IFT is further reduced to 0.02 mN/m. For fresh Troll B oil, a higher reduction in the IFT is observed with the MEL-based oil dispersant formulation than with Corexit 9500A. For weathered 200° C.+ Troll B oil, with the MEL-based oil dispersant formulation displays even lower IFT values are achieve than the ones obtained for fresh Troll B oil with the same formulation. For the waxy crude oil (Norne 2), the IFT results obtained with MEL-based oil dispersant formulation or Corexit 9500A. More precisely, the MEL-based oil dispersant formulation and Corexit 9500A reduced, respectively, the IFT to 0.03 mN/m and 0.02 mN/m (0-100 s) and to 0.008 mN/m and 0.010 mN/m (after 60 min). For the asphaltenic crude oil (Oseberg A) and the marine diesel oil (MDO), Corexit 9500A displayed lower IFT values than the MEL-based oil dispersant formulation (Table 1). Finally, for the high-density and highly asphaltenic IFO 180 bunker fuel oil, the MEL-based oil dispersant formulation displays much better IFT results than Corexit 9500A, with average IFT (after 60 min) of 0.03 and 0.20 mN/m, respectively.

In an embodiment, for high density, weathered, highly asphaltenic and highly viscous oils the results indicate that the MEL-based oil dispersant formulation works comparatively better than Corexit 9500A. These results are very surprising and encouraging as it is commonly difficult to reduce the IFT of highly asphaltenic, waxy and weathered oils.

In an embodiment, there is no apparent effect of the variable temperature on the IFT of naphthenic crude oil (fresh Troll B oil) premixed with MEL-based oil dispersant formulation (Table 2). The effect of temperature is also tested in weathered 200° C.+ Troll B oil premixed with MEL-based oil dispersant formulation or with Corexit 9500A. At 5° C., Corexit 9500A displays lower IFT values than the MEL-based oil dispersant formulation. Still, the IFT was significantly reduced by the MEL-based oil dispersant formulation, ranging from 0.007 to 0.009 mN/m. Interestingly, it was noticed a constant IFT along the experimental time, compatible with the absence of a leaching phenomenon. At 20° C., both Corexit 9500A and the MEL-based oil dispersant formulation display very low IFT values, but the IFT results were comparatively better with the MEL-based oil dispersant formulation, ranging from 0.002 to 0.004 mN/m. At 60° C. Corexit 9500A displays slightly better results than the MEL-based oil dispersant formulation. The IFT results indicate that the large variation among temperatures did not reduce the DE of the MEL-based oil dispersant formulation and IFT values were in the range of 0.002-0.02 mN/min.

TABLE 2

Interfacial tension (IFT) of the naphthenic crude oil (fresh and weathered 200° C. + Troll B oil) at different temperatures. Oils were premixed with Corexit 9500A and the MEL-based oil dispersant formulation ("M + T") at DOR of 1:50 and 1:20 respectively.

| Oil types | IFT (mN/m) 0-100 s "M + T" (DOR 1:20) | IFT (mN/m) 60 min "M + T" (DOR 1:20) | IFT (mN/m) 0-100 s Corexit 9500A (DOR 1:50) | IFT (mN/m) 60 min Corexit 9500A (DOR 1:50) |
|---|---|---|---|---|
| Fresh Troll B (5° C.) | 0.040 | 0.040 | 0.020 | 0.003 |
| Fresh Troll B (20° C.) | 0.030 | 0.020 | 0.050 | 0.050 |
| Fresh Troll B (60° C.) | 0.050 | 0.040 | 0.010 | 0.010 |
| Weathered 200° C. + Troll B (5° C.) | 0.007 | 0.009 | 0.002 | 0.001 |
| Weathered 200° C. + Troll B (20° C.) | 0.004 | 0.002 | 0.010 | 0.006 |
| Weathered 200° C. + Troll B (60° C.) | 0.020 | 0.010 | 0.020 | 0.008 |

DOR: dispersant-to-oil ratio.

Figure 2:
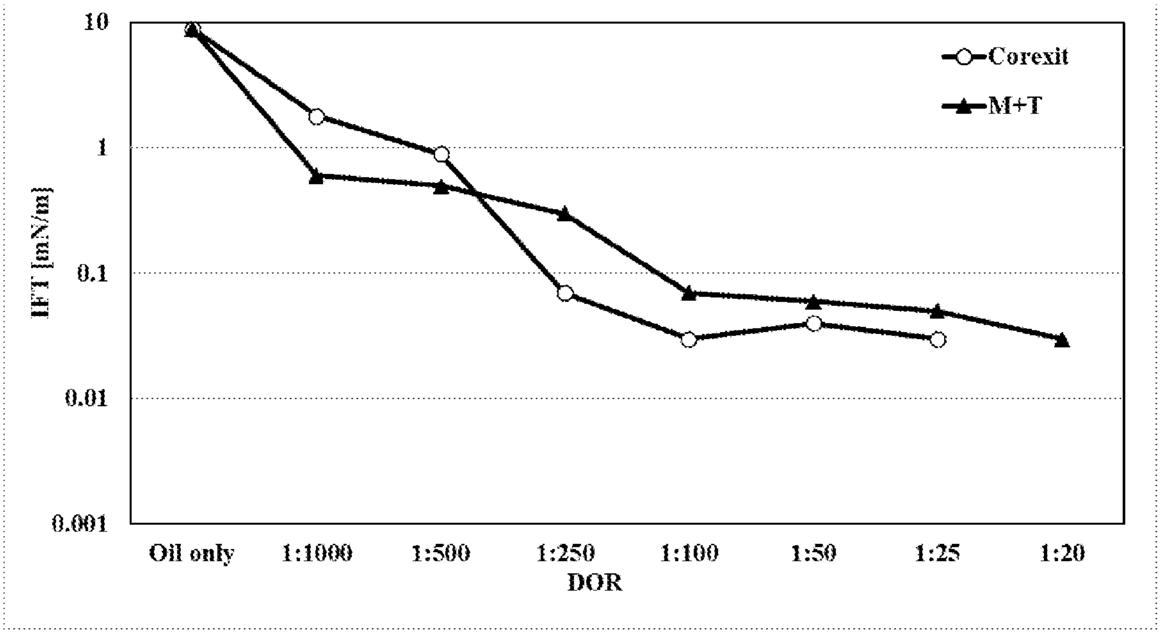
FIG. 2: Embodiment of the effect of dispersant-to-oil ratio (DOR) on the interfacial tension (IFT) (0-300 s) of MEL-based oil dispersant formulation ("M+T")—Troll B or and Corexit 9500A-Troll B systems (20-22° C.).

In an embodiment, the IFT between naphthenic oil (fresh Troll B) and seawater was also evaluated as function of the dispersant dosage or dispersant-to-oil ratio (DOR). The use of MEL-based oil dispersant formulation and Corexit 9500A were compared. The results clearly indicate that at low DOR (1:1000 and 1:500) the DE of the MEL-based oil dispersant formulation is better, while at moderate (1:100 to 1:250) and higher DOR (1:50 and 1:25), Corexit 9500A displays slightly better IFT results than the MEL-based oil dispersant formulation (FIG. 2).

Dispersibility Tests of the MEL-Based Oil Dispersant Formulation

Several standardized methods for evaluating the effect of dispersants have been developed over the last decades. The mixing energy input differs in different test methods, so the DE results obtained reflect the mixing energies.

Mackay-Nadeau-Steelman (MNS) test [13] is estimated to represent a moderate to high sea-state condition. Oil dispersibility requires high energy, which on the sea is generated by the breaking waves during dispersion. In the laboratory, the energy input is supplied by blowing air across the oil/water surface to produce a circular wave motion. In an embodiment, Troll B 200° C.+ and IFO 180 were included for dispersibility tests. Oil (10 mL) was applied to 6 liters of seawater and then the dispersant was injected on the oil surface at a DOR of 1:25 for Corexit 9500A and 1:20 for the MEL-based oil dispersant formulation. The oil is confined in a ring on the seawater surface. By removing the ring, the pre-treated oil is released and mixed naturally into the water column during the wave activity. After 5 min of mixing, 500 mL of the oil dispersion was sampled from the system, oil was extracted using dichloromethane liquid-liquid extraction and extracts were analyzed in an ultraviolet spectrophotometer at 410 nm for determining the dynamic dispersion effectiveness (%). After sampling for determining the dynamic DE, mixing was stopped, and another sample was taken 5 min later to determine the static dispersion effectiveness (%).

In an embodiment, Baffled Flask Test (BFT) was performed according to modifications introduced by Zhang et al. [14] to the method developed by Sorial et al. [15]. Moreover, in these assays natural seawater was used instead of artificial seawater. Initially, 120 mL of natural seawater was added to a baffled flask and then 100 μL of fresh Troll B was carefully added to the seawater surface using a 100-μL pipette. Afterwards, 4 μL of either Corexit 9500A or MEL-based oil dispersant formulation was added onto the center of the oil slick. The flask was shaken at a rotation speed of 200 rpm on an orbital shaker (ELMI DOS-20L Digital Orbital Shaker 20 mm). After shaking for 10 min, the flask was left stationary for another 10 min. Then 2 mL of the mixture was discarded through a stopcock at the bottom of the flask before and then 30 mL of the sample was collected into a 50-mL measuring cylinder. The 30 mL sample was then poured into a separatory funnel and extracted with 5 mL dichloromethane (DCM, HPLC grade) for three times. Anhydrous sodium sulfate was added into the extract to remove water that may be contained in solvent. Afterwards, the extract was adjusted to a volume of 20 mL for determination of DE by ultraviolet spectrophotometry. The BFT was run in triplicate for each dispersant.

In an embodiment, standard crude oil solutions were prepared for calibrating the ultraviolet spectrophotometer (UVS). Volumes of 5, 10, 15, 20, and 25 μL Troll B crude oil were added, using a syringe, to 30 mL of dichloromethane (DCM) (HPLC grade), respectively. These Troll B in DCM solutions were regarded as standard references representing DE of 20, 40, 60, 80, and 100%. UVS was employed to measure the absorbance. The absorbance of the extracts was measured at three wavelengths: 340, 370, and 400 nm. The area under the absorbance vs. wavelength curve between 340 and 400 nm was regarded as the relative concentration of dissolved oil [16], and was determined by the following equation using the trapezoidal rule:

$$\text{Area} = \frac{(\text{Abs}_{340} + \text{Abs}_{370}) \times 30}{2} + \frac{(\text{Abs}_{370} + \text{Abs}_{400}) \times 30}{2} \quad \text{(Equation 3)}$$

DE can be calculated as the ratio of the area of dispersed oil to the area of total oil added to the system (equals to the corresponding volume of oil dissolved in DCM). The standard curve was plotted using the value of area to DE. The coefficient of determination should be larger than 0.99.

Baffled Flask Tests

Figure 3:
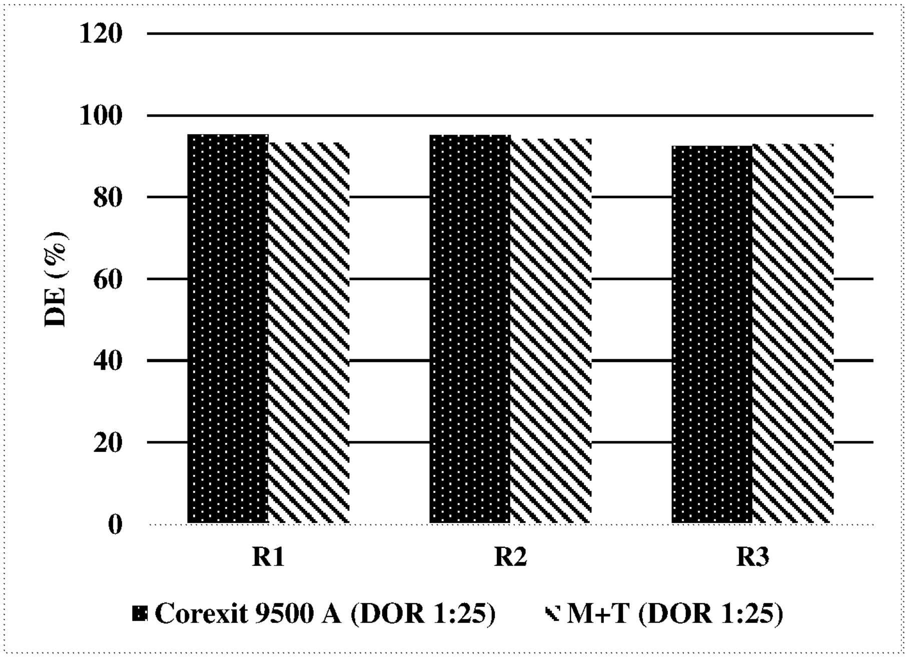
FIG. 3: Embodiment of the dispersion effectiveness (DE) for the MEL-based oil dispersant formulation ("M+T") or Corexit 9500A in fresh Troll B oil as obtained in the Baffled Flask Test (BFT) (25° C.). R1-3 are BFT replicates. DOR: dispersant-to-oil ratio.

FIG. 3 shows the dispersion effectiveness (DE) of Corexit 9500A of the MEL-based oil dispersant formulation for fresh Troll B oil evaluated by the Baffled Flask Test (BFT). For the MEL-based oil dispersant formulation, DE ranges from 93 to 94%, whereas for Corexit 9500A DE ranges from 93 to 95%. The DE obtained for fresh Troll B oil alone (without dispersant) is usually below 10%. The BFT results indicate a high dispersibility of fresh Troll B oil both using MEL-based and the Corexit 9500A oil dispersants. The results may, however, be misleading because of the high shear imparted on the oil-water mixtures. The use of alternative dispersibility tests like the MNS test can help to elucidate differences between both dispersants' efficacy.

Mackay-Nadeau-Steelman Tests

For the Mackay-Nadeau-Steelman dispersibility test (MNS), weathered oil 200° C.+ Troll B and heavy IFO 180 bunker fuel oil were selected as target oils. The MNS results show a 100% dynamic DE with both dispersants. The control sample of weathered 200° C.+ Troll B oil (without oil dispersant) also shows 78% DE, indicating that the mechanical energy of the wave generated in the system for mixing, is a major contributor to the dynamic DE.

Figure 4:
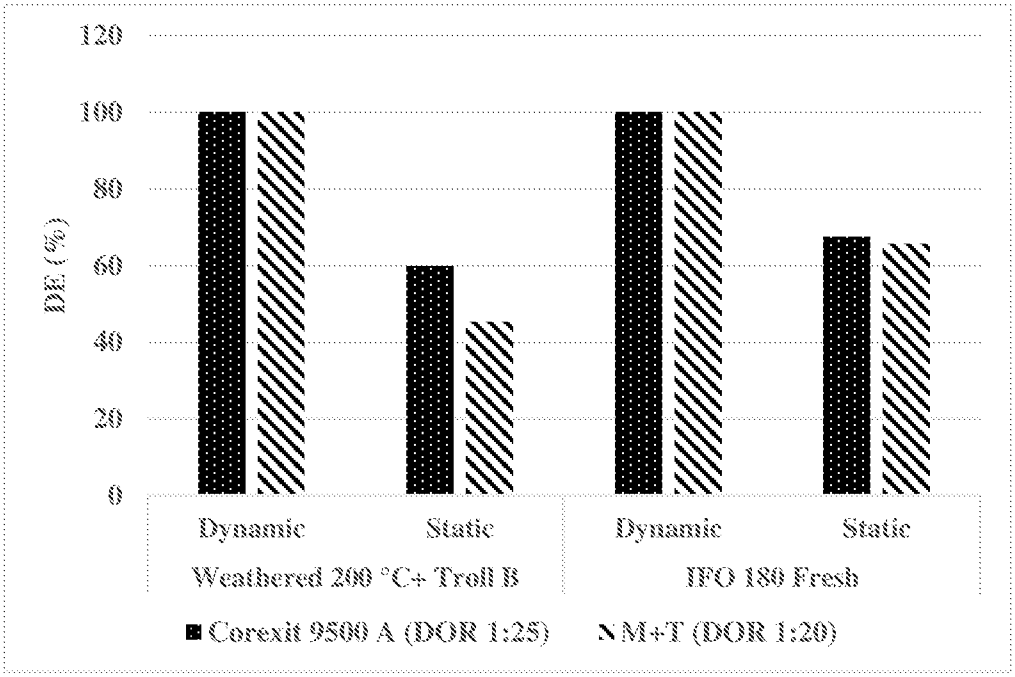
FIG. 4: Embodiment of the dispersion effectiveness (DE) for the MEL-based oil dispersant formulation ("M+T") and Corexit 9500A in weathered 200° C.+ Troll B oil and IFO 180 bunker fuel oil as obtained in the Mackay Nadeau Steelman Test (13° C.). DOR: dispersant-to-oil ratio.

In addition to the dynamic DE, the static DE was also estimated 5 min after mixing has been stopped. The static DE shows a relatively high dispersibility of IFO 180 bunker fuel oil (i.e., >60%), both for the MEL-based oil dispersant formulation and Corexit 9500A (FIG. 4). For weathered 200° C.+ Troll B oil, Corexit 9500A had a higher DE (60%) than the MEL-based oil dispersant formulation (45%). A different DOR was used for each dispersant based on their effective dosage.

Mechanism for Interfacial Tension Reduction and Dispersibility by the MEL-Based Oil Dispersant Formulation The overall results show that the MEL-based oil dispersant formulation exhibits excellent IFT and dispersibility results and are comparable with a standard and key dispersant for the industry (i.e., Corexit 9500A). Moreover, for the highly asphaltenic and high-density crude oils the IFT results are even better for MEL-based oil dispersant formulation than for Corexit 9500A.

In an embodiment, the results can be explained by providing the molecular level discussion of the synergy between MEL and polyethylene glycol sorbitan monooleate molecules. As explained earlier, MELs are hydrophobic and polyethylene glycol sorbitan monooleate is quite hydrophilic and water soluble. The HLB of the combination of the two surfactants can be calculated by the following expression:

$$HLB = 8.6W_M + 15W_{PGSE} \qquad \text{(Equation 4)}$$

Where, $W_M$ and $W_{PGSE}$ are, respectively, the weight fraction of MELs and polyethylene glycol sorbitan ester, in particular polyethylene glycol sorbitan monooleate, in the blend. Previous studies [17, 18] showed that HLB in the range of 9-12 may be optimal for creating the efficient dispersant for OSR application. In an embodiment, the lowest IFT with fresh Troll B oil (0.01 mN/m) was achieved at a 60:40 ratio (w/w) of MELs and polyethylene glycol sorbitan monooleate (TWEEN® 80) (42% (w/w) MELs+28% (w/w) TWEEN® 80+30% (w/w) Solvent base) where HLB is 11.6.

Previous studies by Athas et al. [17] and Jin et al. [18] reported that the dispersant mixture of Lecithin (L) and TWEEN® 80 (T) at the 60:40 ratio (w/w) with an HLB value of 10.8 exhibited the best emulsification results with crude oil. They found that the L/T blend shows a synergistic effect, but neither L nor T is effective on its own. Moreover, Shah et al. [19] also studied that the stable O/W emulsion formed at an optimal ratio of 60:40 (w/w) of lactonic sophorolipid and choline laurate (ionic surfactant). Moreover, the minimum IFT achieved with L/T and sophorolipid/choline laurate mixtures against the crude oil/seawater interface was 0.075 mN/m and 1.5 mN/m respectively.

The synergy between MELs and T is likely due to the strong Van der Waals forces between the hydrocarbon chains of both surfactant molecules. Beside the tail interaction, there also exists a favorable interaction between the mannose and oxyethylene head groups of MELs and T molecules, respectively. Athas et al. [17] suggested that the oxyethylene head group of a T molecule also provides the steric stabilization to the oil droplet by extending into the water phase. The combination of both Van der Waals forces and stabilization of oxyethylene head groups creates a very stable interfacial film at the crude oil/water interface. Such stability prompts a quick decrease in the IFT and prevents the desorption of MEL and T molecules from the interface.

Comparison of the MEL-Based Oil Dispersant Formulation with Other Solutions

One of the main advantages of using the MEL-based oil dispersant formulation for OSR and EOR applications is the combination of both high DE in crude oil and stability of the resulting emulsions. In an embodiment, the MEL-based oil dispersant formulation was compared with two examples of green and/or efficient oil dispersants known from the state of the art: L/T-based oil dispersant [17, 18], and an ionic liquids-based oil dispersant (namely a combination of 1-butyl-3-methylimidazolium lauroylsarcosinate, 1,1'-(1,4-butanediyl)bis(1-H-pyrrolidinium, which are environmentally problematic and not biobased) dodecylbenzenesulfonate, tetrabutylammonium citrate, tetrabutylammonium polyphosphate and tetrabutylammonium ethoxylate oleyl ether glycolate as described in Baharuddin et al. [20]). The L/T blend shows a synergetic action, when the two surfactants are combined at the oil/water interface, on further enhancing the emulsification capacity of the dispersant. The ionic liquids-based oil dispersant is presented as a biodegradable and non-toxic solution.

Unlike the L/T-based oil dispersant described in Jin et al. [18], the MEL-based oil dispersant formulation shows no desorption/release of surfactant molecules from the crude oil (fresh Troll B oil)/seawater interface, at temperatures between 5 and 60° C. and from high (1:25) to moderate DOR (1:100). The phenomenon of surfactant desorption (leaching) can be expressed as either an increase in the IFT of the oil dispersant mixture or an increase in the mean diameter of the emulsion, as reported by Jin et al. [18]. In addition, the formulation used by Jin et al. [18] contains an ethanol base which is not adequate for OSR application. Selected solvents should have a low toxicity, high flash point (i.e., >60° C.) and yield a good oil dispersion (low viscosity).

The MEL-based oil dispersant formulation exhibits much lower IFT values (0.002 mN/m) than the L/T blend (0.08 mN/m) and stable dynamic behavior for several types of crude oil and at a wide range of temperature values. This suggests that MEL and T molecules pack more closely at the oil/water interface. The condensed packing at the interface can be due to favorable interactions between the tail and head group of both MEL and T molecules. The common structure of MELs has two fatty acid tails, which are C8-C12 in length (hydrophobic chain), and a mannosylerythritol head group (hydrophilic head). On the other hand, T has an oleyl tail, which is C18 and three hydrophilic oxyethylene head groups.

The MEL-based oil dispersant formulation also shows higher DE (94%) for fresh Troll B oil at DOR 1:25, during BFT tests, than the ionic liquids-based oil dispersant for Arab and Ratawi crude oil. [20]. The MEL-based oil dispersant formulation presents ultra-low IFT values (0.010-0.002 mN/m) in weathered 200° C.+ Troll B oil after 1 h at 5 and 60° C. (DOR 1:20). Despite IFT measurements for the ionic liquids-based oil dispersant in Arab crude oil also showed ultra-low IFT values (0.006-0.004 mN/m) at 25° C. and 50° C. (DOR 1:10), Baharuddin et al. [20] do not specify the time considered for measurements. Baharuddin et al. [20] also report a considerable increase in the IFT between 25 to 50° C. at low salinity (i.e., <3 wt. %).

Evaluation of the MEL Based Oil Dispersant Formulations Toxicity in a Marine Environment In an embodiment, a standardized protocol was used to evaluate the toxicity of the MEL-based oil dispersant formulation in a marine environment, following a 24 h $LC_{50}$ bioassay using brine shrimp (*Artemia*) and its hatching. This bioassay was conducted according to the standard operational procedures of the marine toxicity screening test Artoxkit M, obtained from Microbiotests Inc., using instar II-III larvae of the brine shrimp *Artemia franciscana* hatched from cysts, standard seawater medium with a salinity of 35 ppt and a 24 multiwell test plate, provided in the commercial kit.

In an embodiment, the hatching of the cysts, carried out through exposure to a light source (minimum of 3000-4000 lux) during 30 h at 25° C., starts after about 18-20 h. After 30 h most of the larvae are in the desired instar II-III stage. The larvae are then transferred from the hatching medium to a rinsing well containing 1 ml of the test solution, thus exposing the larvae to the appropriate test solution before they entered the actual test well and minimizing dilution of the test solution during transfer. For each compound tested, the bioassay included one control and five concentrations of the tested compound, each of them with 3 replicates of 10 animals. The incubation was carried out in the dark at 25° C. and for 24 hours, then the dead larvae in each test solution well were counted to estimate the percentage of mortality. The median lethal concentration ($LC_{50}$) was calculated from the five assays with different concentrations.

In an embodiment, the toxicity for the marine environment was evaluated for MEL-based oil dispersant formulation (42% (w/w) blend of MELs, 28% (w/w) TWEEN® 80 and 30% (w/w) solvent base), against a formulation without MEL (i.e., with 48% (w/w) Tween® 80 and 52% (w/w) solvent base), MEL and Corexit 9500. The results are presented in table 3.

TABLE 3

*Artemia franciscana* toxicity tests of MEL-based oil formulation, formulation components, MEL, Corexit ® 9500.

| Compound | $LC_{50}$ (mg/l) |
|---|---|
| Corexit ® 9500 | 78.9 ± 2.8 |
| MEL-based oil dispersant formulation | 405.2 ± 10.3 |
| TWEEN ® 80 + solvent base (i.e. oil formulation without MEL) | 182.2 ± 4.4 |
| MEL | 512.7 ± 66.8 |

According to the results (Table 3), Corexit showed strong a toxicity ($LC_{50}$ of 78.9), the mixture of Tween® 80 and the solvent base (the developed formulation without MEL) exhibits a moderate cytotoxicity ($LC_{50}$ of 182.2 mg/l) and MEL showed a weak toxicity in *A. franciscana* ($LC_{50}$ higher than 400 mg/l). Surprisingly, the MEL-based oil dispersion formulation (MEL+TWEEN® 80+solvent base) not only showed a much lower toxicity than Corexit, but also a weaker toxicity ($LC_{50}$ of 405.2±10.3 mg/l) as compared to the formulation without MEL ($LC_{50}$ of 182.2±4.4 mg/i), disclosing for the first time the surprising effect of MEL as an environmentally friendly agent not only when used alone, but also its positive effect when used in combinations with other dispersant agents.

Evaluation of the MEL-Based Oil Dispersant Formulations for Marine Environment Crude Oil Bioremediation In an embodiment, biodegradation studies of crude oil were performed in 250 ml baffled shaking flasks with a working volume of 100 ml of seawater medium (i.e., 50% (v/v) seawater and 50% (v/v) Bushnell-Haas medium). Seawater was collected from coordinates 38° 24.977N, 8° 58.073W at a distance of 3 to 5 km from the coast of Setubal, Portugal at a depth of 74 m, placed at 25° C. and filtered using 25 μm paper filter. In this assay, the oil biodegradation relies on endogenous microorganisms present on the seawater, as no additional microorganisms were inoculated. Troll B crude oil was used as sole carbon source, pre-mixed with the oil dispersant formulations, as previous described, and applied to the sea water media. The flasks containing these solutions were incubated at 25° C. for 7 days (150 rpm). At the end the experiment, 10 mL of HCl (15% v/v) was added for microbiological inactivation and the resulting aqueous solution samples were stored at 4° C. not more than up to 3 days. Then, two step extractions of the hydrocarbon contents in such aqueous samples were extracted by two step extractions using n-hexane (50 ml aqueous solution+25 ml of n-hexane, ≥95%, HPLC grade, Fisher Chemical), adding 0.1 mL of pristane (10 g/L in n-hexane) as an internal standard. The upper phases (organic) were concentrated by evaporation of n-hexane, using a rotary evaporator, until a volume of roughly 2 ml. The concentrated sample was filtered with a Pasteur pipette containing cotton, silica gel and anhydrous sodium sulphate and transferred to a glass vial. Its volume was further reduced to 0.9 ml using nitrogen stripping and then 0.1 ml of 5-α-androstane (10 g/l in n-hexane) was added as an external standard. Samples were stored at −20° C. prior to gas chromatography analysis.

In an embodiment, total hydrocarbon content (THC) samples taken from the bioremediation assay were assessed. THC comprises a large family of chemical compounds originally driven from crude oil. Crude oil comprises a very complex mixture made of many different chemicals. Therefore, for practical reasons, instead of measure each individual compound, THC is measured together to assess the evolution amount of crude oil present at an oil spill site. THC were analysed by a GC (Hewlett-Packard, HP5890)

fitted with a flame ionization detector (FID) and with an oven temperature set to be held first at an initial value of 60° C., over 2 min, then to increase at a rate of 6° C./min until it reaches 310° C., and finally to be held at such value for a final 5 min. The injector and detector the temperatures were set to be was 300° C. and 310° C. respectively. Injected sample volume was 1 μL. Calibration curves were made for both crude oil and alkane mixture standards using a series of dilutions (5 g/L, 2 g/L, 1 g/L, 0.5 g/L, 0.2 g/L in n-hexane) with 5-α-androstane as an internal standard. A relative response factor (RRF) was then calculated using equation 5 based on the concentrations (C) and areas (A) of the internal (andr) and external alkane standards (std). Moreover, the internal standards of pristane (prist) were added to the aqueous solution to quantify the percentage of hydrocarbons recovered in the extraction, using equation 5.

$$RRF = \frac{A_{andr} \times C_{std}}{A_{std} \times C_{andr}} \quad \text{(Equation 5)}$$

$$\text{Recovery } (\%) = \frac{A_{andr}}{A_{prist}} \quad \text{(Equation 6)}$$

For the crude oil samples, the total area ($A_{total}$) was obtained by integration of the GC-FID spectrum peaks. The THC area ($A_{THC}$) was then calculated by subtracting the area of the internal standards ($A_{andr}$, $A_{pris}$) to the total area (equation 7) and the concentration of hydrocarbons in each sample ($C_{THC}$) was then calculated using the equation 8.

$$A_{THC} = A_{total} - A_{andr} - A_{pris} \quad \text{(Equation 7)}$$

$$C_{THC} = \frac{A_{THC} \times C_{andr}}{A_{andr}} \times RRF \times \text{Recovery} \quad \text{(Equation 8)}$$

Figure 5:
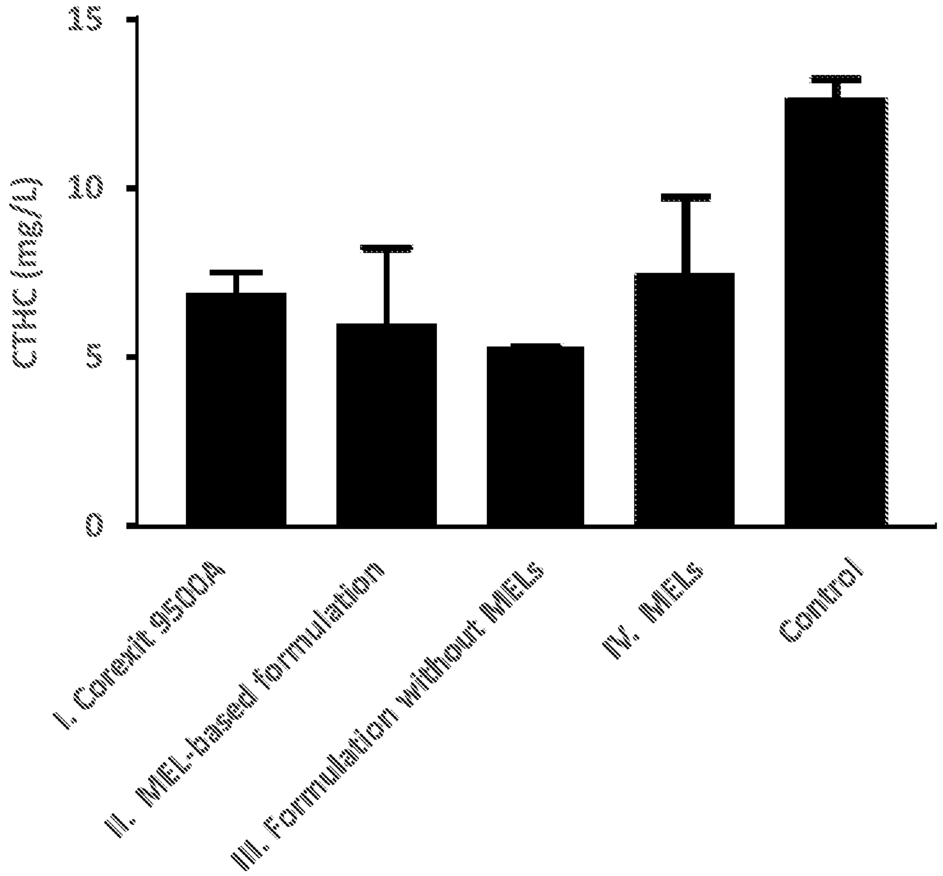
FIG. 5: Embodiment of the total hydrocarbon content (THC) present after 7 days of incubation, at 25° C., in sea water and Bushnell-Haas (BH) media contaminated with crude oil (50 mg/L) (Control), contaminated with crude oil (50 mg/L) and mixed with the oil dispersant formulations: Corexit 9500A (I); disclosed MEL-based oil dispersant formulation (II), oil dispersant formulation inhere disclosed (TWEEN® 80+solvent base), but without MELs (III), and MELs alone as dispersant (IV). Formulations I, II, III were used at a DOR of 1:20 and formulation IV at a DOR of 1:48 (ensuring formulation II and IV contain the same amounts of MELs).

In an embodiment, Corexit® 9500 (I) was used as benchmarking, to assess the bioremediation efficiency of the MEL-based oil dispersant formulation (II) against the formulation without MEL (TWEEN®+solvent base) (III) and MEL alone (IV). Troll B crude oil was pre-heated at 50° C. for 1 h and mixed with the oil dispersant at 500 rpm for 3 h at room temperature, employing 1:20 dispersant to oil ratio (DOR) for formulations I, II and III, and 1:48 DOR for formulation IV (formulations II and IV employs the same amount of MEL). The results on FIG. 5 shows, in comparison with the control, a decrease on $C_{THC}$ when any of the four oil dispersant formulations was used for 7 days. This result shows a clear efficiency of the four formulations assessed at laboratory scale. However, for applications on real settings, the efficiency and safety of those formulations rely on effective dispersion and low environment impact as evaluated, respectively, by IFT and $LC_{50}$ values, pointing out for the superior performance of the MEL-based oil dispersant formulation.

The term "comprising" whenever used in this document is intended to indicate the presence of stated features, integers, steps, components, but not to preclude the presence or addition of one or more other features, integers, steps, components or groups thereof.

The disclosure should not be seen in any way restricted to the embodiments described and a person with ordinary skill in the art will foresee many possibilities to modifications thereof. The above-described embodiments are combinable.

The following claims further set out particular embodiments of the disclosure.

REFERENCES

1. Gbadamosi, A. O., et al., *An overview of chemical enhanced oil recovery: recent advances and prospects. International Nano Letters,* 2019. 9(3): p. 171-202.
2. Sandersen, S. B., *Enhanced Oil Recovery with Surfactant Flooding, in Department of Chemical and Biochemical Engineering.* 2012, Technical University of Denmark: Konges Lingby, Denmark.
3. Belhaj, A. F., et al., *The effect of surfactant concentration, salinity, temperature, and pH on surfactant adsorption for chemical enhanced oil recovery: a review.* Journal of Petroleum Exploration and Production Technology, 2020. 10(1): p. 125-137.
4. Almeda, R., C. Hyatt, and E. J. Buskey, *Toxicity of dispersant Corexit* 9500*A and crude oil to marine microzooplankton.* Ecotoxicology and Environmental Safety, 2014. 106: p. 76-85.
5. Kleindienst, S., et al., *Chemical dispersants can suppress the activity of natural oil-degrading microorganisms.* Proceedings of the National Academy of Sciences, 2015. 112(48): p. 14900.
6. Garr, A. L., S. Laramore, and W. Krebs, *Toxic Effects of Oil and Dispersant on Marine Microalgae.* Bulletin of Environmental Contamination and Toxicology, 2014. 93(6): p. 654-659.
7. Banat, I. M., et al., *Microbial biosurfactants production, applications and future potential.* Applied Microbiology and Biotechnology, 2010. 87(2): p. 427-444.
8. Soberón-Chávez, G. and R. M. Maier, *Biosurfactants: A General Overview*, in *Biosurfactants: From Genes to Applications*, G. Soberón-Chávez, Editor. 2011, Springer Berlin Heidelberg: Berlin, Heidelberg. p. 1-11.
9. Aparna, A., G. Srinikethan, and H. Smitha, *Production* and *characterization of biosurfactant produced by a novel Pseudomonas* sp. 2*B*. Colloids and Surfaces B: Biointerfaces, 2012. 95: p. 23-29.
10. Yu, M., et al., *Characteristics of mannosylerythritol lipids and their environmental potential.* Carbohydrate Research, 2015. 407: p. 63-72.
11. Freitas, B., et al., *Formulation of a Commercial Biosurfactant for Application as a Dispersant of Petroleum and By-products Spilled in Oceans.* Frontiers in Microbiology, 2016. 7(1646).
12. Figueiredo Nascimento, M., *Mannosylerythritol lipids bioproduction by Moesziomyces* spp.: *assessing alternative culture strategies* and *nanofiltration downstream purification*, in Department of Bioengineering. 2017, University of Lisbon.
13. Mackay, D. and F. Szeto, *The laboratory determination of dispersant effectiveness: method development and results.* International Oil Spill Conference Proceedings, 1981. 1981(1): p. 11-17.
14. Zhang, K., et al., *Generation of shrimp waste-based dispersant for oil spill response.* Environmental Science and Pollution Research, 2018. 25(10): p. 9443-9453.
15. Sorial, G. A., et al., *Oil Spill Dispersant Effectiveness Protocol. II: Performance of Revised Protocol.* Journal of Environmental Engineering, 2004. 130(10): p. 1085-1093.
16. Chandrasekar, S., G. A. Sorial, and J. W. Weaver, *Dispersant effectiveness on oil spills—impact of salinity.* ICES Journal of Marine Science, 2006. 63(8): p. 1418-1430.
17. Athas, J. C., et al., *An Effective Dispersant for Oil Spills Based on Food-Grade Amphiphiles.* Langmuir, 2014. 30(31): p. 9285-9294.

18. Jin, J., et al., *An efficient and environmental-friendly dispersant based on the synergy of amphiphilic surfactants for oil spill remediation*. Chemosphere, 2019. 215: p. 241-247.

19. Shah, M. U. H., et al., *A binary mixture of a biosurfactant and an ionic liquid surfactant as a green dispersant for oil spill remediation*. Journal of Molecular Liquids, 2019. 280: p. 111-119.

20. Baharuddin, S. H., et al., *Development, formulation and optimization of a novel biocompatible ionic liquids dispersant for the effective oil spill remediation*. Chemosphere, 2020. 249: p. 126125.

The invention claimed is:

1. An oil dispersant composition for dispersing a crude oil or a petrochemical spill, comprising:
- at least 20% (w/w) of a gum comprising a mixture of mannosylerythritol lipids;
- at least 10% (w/w) polyethylene glycol sorbitan ester; and
- at least 20% (w/w) of a hydrophobic organic solvent, wherein said organic solvent has a flash point superior to the crude oil or the petrochemical spill flash point.

2. The oil dispersant composition according to claim 1, comprising
- 35-45% (w/w) of the gum comprising the mannosylerythritol lipids mixture;
- 25-30% (w/w) of the polyethylene glycol sorbitan ester; and
- 25-35% (w/w) of the hydrophobic organic solvent.

3. The oil dispersant composition according to claim 1, wherein the polyethylene glycol sorbitan ester is polyethylene glycol sorbitan monooleate.

4. The composition according to claim 1, wherein the number of carbons in the fatty chains of the mannosylerythritol lipids range from C8 to C12.

5. The oil dispersant composition according to claim 1, wherein at least 50% (w/w) of the fatty chains of the mannosylerythritol lipids are C10 chain.

6. The oil dispersant composition according to claim 1, wherein the mannosylerythritol lipids are selected from a list consisting of di-acetylated mannosylerythritol lipid, mono-acetylated mannosylerythritol lipid, de-acetylated mannosylerythritol lipid, or mixtures thereof.

7. The oil dispersant composition according to claim 1, wherein the gum comprises a mixture of:
- at least 50% (w/w) of di-acetylated mannosylerythritol lipid;
- 15% (w/w) to 50% (w/w) of mono-acetylated mannosylerythritol lipid; and
- less than 35% (w/w) of de-acetylated mannosylerythritol lipid.

8. The oil dispersant composition according to claim 1, wherein the organic solvent comprises 65-70% (v/v) of a lighter fuel and 30-35% (v/v) of 2-ethylhexyl acetate.

9. The oil dispersant composition according to claim 1, wherein the mass ratio between the mannosylerythritol lipids and the polyethylene glycol sorbitan ester is 60:40.

10. The oil dispersant composition according to claim 1, wherein the hydrophilic-lipophilic balance ranges from 8 to 20.

11. A method for obtaining an oil dispersant composition for applying to a crude oil or a petrochemical spill, said oil dispersant composition comprising at least 20% (w/w) of a gum comprising a mixture of mannosylerythritol lipids, at least 10% (w/w) polyethylene glycol sorbitan ester, and at least 20% (w/w) of a hydrophobic organic solvent, wherein said organic solvent has a flash point superior to the crude oil or the petrochemical spill flash point, the method comprising the following steps:
- obtaining the gum comprising the mannosylerythritol lipids mixture;
- blending the mannosylerythritol lipids mixture with the polyethylene glycol sorbitan ester and with the organic solvent.

12. The method for obtaining an oil dispersant composition according to claim 11, wherein the organic solvent comprises 65-70% (v/v) of a lighter fuel and 30-35% (v/v) of 2-ethylhexyl acetate.

13. A method for dispersing an oil spill, comprising a step of applying an oil dispersant composition into a crude oil or a petrochemical spill in a body of water, wherein the oil dispersant composition comprises:
- at least 20% (w/w) of a gum comprising a mixture of mannosylerythritol lipids;
- at least 10% (w/w) polyethylene glycol sorbitan ester; and
- at least 20% (w/w) of a hydrophobic organic solvent, wherein said organic solvent has a flash point superior to the crude oil or the petrochemical spill flash point.

14. The method of claim 13, wherein the oil dispersant composition is applied in a dispersant to oil ratio ranging from 1:1000 to 1:20.

15. The method according to claim 13 wherein the oil dispersant composition is applied in a dispersant to oil ratio ranging from 1:900 to 1:500.

16. The method according to claim 13, wherein the dynamic dispersion effectiveness of the oil dispersant composition in the body of water ranges from 95 to 100% at 22° C.

17. The method according to claim 13, wherein the static dispersant effectiveness of the oil dispersant composition in the body of water ranges from 45 to 70% at 13° C.

18. The method according to claim 13, wherein the interfacial tension between the crude oil or the petrochemical spill and the body of water, in the presence of the oil dispersant composition, is below 0.030 mN/m at 20° C.

19. The method according to claim 13, wherein the dynamic interfacial tension between the crude oil or the petrochemical spill and the body of water, in the presence of the oil dispersant composition ranges between 0.04 to 0.002 mN/m at a dispersant to oil ratio of 1:20, from 5° C. to 60° C.

20. The method according to claim 13, wherein the body of water has a salinity ranging from 0 to 5 wt %.

* * * * *